United States Patent
Yun et al.

(10) Patent No.: US 7,782,937 B2
(45) Date of Patent: Aug. 24, 2010

(54) SYSTEM AND METHOD FOR INTERNET BROADCASTING OF MPEG-4-BASED STEREOSCOPIC VIDEO

(75) Inventors: Kug-Jin Yun, Daejon (KR); Suk-Hee Cho, Daejon (KR); Chung-Hyun Ahn, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1346 days.

(21) Appl. No.: 10/553,667

(22) PCT Filed: Apr. 14, 2004

(86) PCT No.: PCT/KR2004/000871

§ 371 (c)(1),
(2), (4) Date: Oct. 17, 2005

(87) PCT Pub. No.: WO2004/093459

PCT Pub. Date: Oct. 28, 2004

(65) Prior Publication Data

US 2006/0221178 A1    Oct. 5, 2006

(30) Foreign Application Priority Data

Apr. 17, 2003   (KR) .................. 10-2003-0024292

(51) Int. Cl.
*H04N 7/12* (2006.01)
(52) U.S. Cl. ................................. 375/240.01
(58) Field of Classification Search ................ 382/154, 382/232–253; 375/240.01–240.29; 348/42–43; 345/419; 386/109–112; 709/204, 230, 220; 370/464–473
See application file for complete search history.

(56) References Cited

U.S. PATENT DOCUMENTS 5,619,256 A    4/1997   Haskell et al.

(Continued)

FOREIGN PATENT DOCUMENTS

KR    1020020088633    11/2002

(Continued)

OTHER PUBLICATIONS

Yang et al., MPEG-4 Based Stereoscopic Video Sequence Encoder, IEEE 0-7803-8484-9/04, pp. 741-744.*

(Continued)

*Primary Examiner*—Sherali Ishrat
(74) *Attorney, Agent, or Firm*—Lowe Hauptman Ham & Berner LLP (57) ABSTRACT

Provided is a system and method for broadcasting stereoscopic video data to users on the Internet based on Moving Picture Experts Group (MPEG)-4. The system includes: an encoding server for receiving stereoscopic video data, audio data, and Object Descriptor/Binary Format for Scene (OD/BIFS), which is information for controlling a content, and encoding the data into elementary stream (ES) having an MPEG-4 structure; a web server for receiving from the client any one among two-dimensional video display mode, field-shuttering video display mode and frame-shuttering video display mode; and a streaming server for generating a RTP (RTP) packet for real-time data transmission on the Internet by multiplexing the ES based on the display mode inputted into the web server, and transmitting the RTP packet to the client.

14 Claims, 7 Drawing Sheets

U.S. PATENT DOCUMENTS

| | | | |
|---|---|---|---|
| 6,057,884 A | 5/2000 | Chen et al. | |
| 6,574,423 B1* | 6/2003 | Oshima et al. | 386/111 |
| 7,177,357 B2* | 2/2007 | Yun et al. | 375/240.01 |
| 7,385,996 B2* | 6/2008 | Aoki | 370/412 |
| 7,391,811 B2* | 6/2008 | Itoi et al. | 375/240.26 |
| 2003/0095177 A1* | 5/2003 | Yun et al. | 348/42 |
| 2004/0066846 A1* | 4/2004 | Yun et al. | 375/240.08 |
| 2004/0120396 A1* | 6/2004 | Yun et al. | 375/240.01 |
| 2006/0262856 A1* | 11/2006 | Wu et al. | 375/240.19 |
| 2007/0115276 A1* | 5/2007 | Yun et al. | 345/419 |

FOREIGN PATENT DOCUMENTS

| | | |
|---|---|---|
| WO | 01/76257 | 10/2001 |

OTHER PUBLICATIONS

Haskell et al., "Image and Video Coding—Emerging Standards and Beyond", IEEE Transactions on Circuits and Systems For Video Technology, Nov. 1998, pp. 814-837.

* cited by examiner

| LAYER TYPE | INPUT DATA |
|---|---|
| BASE LAYER | LEFT-EYE ODD FIELD |
| 1ST ENHANCEMENT LAYER | LEFT-EYE EVEN FIELD |
| 2ND ENHANCEMENT LAYER | RIGHT-EYE ODD FIELD |
| 3RD ENHANCEMENT LAYER | RIGHT-EYE EVEN FIELD |

| mdata Atom | ES_ID=4 | | | | | | | |
|---|---|---|---|---|---|---|---|---|
| | LEFT-EYE ODD FIELD AU_#1 | LEFT-EYE ODD FIELD AU_#2 | ... | LEFT-EYE ODD FIELD AU_#K | LEFT-EYE ODD FIELD AU_#1 | | | |
| | LEFT-EYE EVEN FIELD AU_#2 | | | LEFT-EYE EVEN FIELD AU_#K | RIGHT-EYE ODD FIELD AU_#1 | RIGHT-EYE ODD FIELD AU_#2 | | |
| | | | | RIGHT-EYE EVEN FIELD AU_#1 | RIGHT-EYE EVEN FIELD AU_#2 | ... | RIGHT-EYE EVEN FIELD AU_#K | |

K:LAST AU NUMBER

[Fig. 8]

| mdata Atom | ES_ID=1 | | | | | | |
|---|---|---|---|---|---|---|---|
| | LEFT-EYE ODD FIELD AU_#1 | RIGHT-EYE EVEN FIELD AU_#1 | LEFT-EYE EVEN FIELD AU_#1 | RIGHT-EYE ODD FIELD AU_#1 | LEFT-EYE ODD FIELD AU_#2 | RIGHT-EYE EVEN FIELD AU_#2 | ··· |

SYSTEM AND METHOD FOR INTERNET BROADCASTING OF MPEG-4-BASED STEREOSCOPIC VIDEO

CROSS REFERENCE TO RELATED APPLICATION

This application is the National Phase application of International Application No. PCT/KR2004/000871, filed Apr. 14, 2004, which designates the United States and was published in English. This application, in its entirety, is incorporated herein by reference.

TECHNICAL FIELD

The present invention relates to a Web broadcasting system and method; and, more particularly, to a system and method for broadcasting a stereoscopic video to users on the Internet based on Moving Picture Experts Group (MPEG)-4.

BACKGROUND ART

'A Stereoscopic video' means a moving picture that is produced by receiving and outputting left-eye data and right-eye data alternately to give three-dimensional far and near distance effect to two-dimensional planes.

Along with the recent development of the Internet, diverse multimedia data in a field of education, culture, current issues and the like are provided to Internet users. Internet users can watch and/or listen to multimedia data they want at any time at any place as long as they have clients connected to the Internet.

Generally, Internet broadcasting systems, which are also referred to as Internet broadcasting systems, are formed of an encoding server for encoding multimedia data based on a predetermined encoding method, a streaming server for transmitting the multimedia stream, and clients for decoding and outputting the transmitted multimedia stream.

Figure 1:
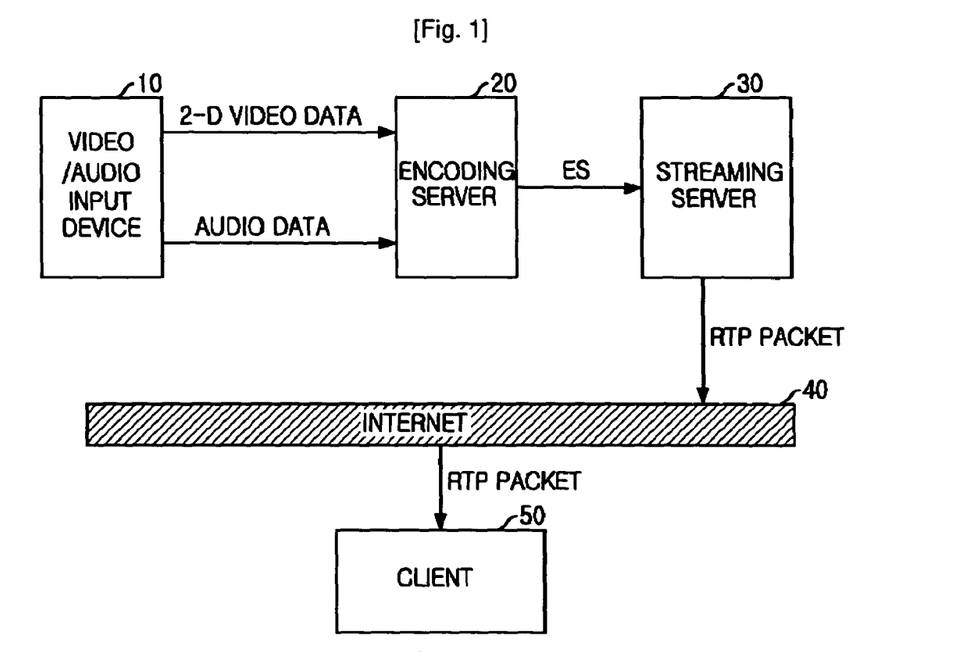
FIG. 1 is a block diagram illustrating a typical Internet broadcasting system.

FIG. 1 is a block diagram illustrating a typical Internet broadcasting system. As shown, video data and audio data are inputted from a video/audio input device 10, such as a video camera, and compressed as they pass through an encoding server 20.

The MPEG is a group of moving picture experts that is formed to establish the standards for moving picture encoding methods. The MPEG studies about moving picture compression that varies continuously based on time and about the transmission of coded data. The MPEG suggests international encoding standards and current Internet broadcasting is performed based on the standards. Particularly, MPEG-1 and MPEG 2 are international standards that are used for compressing and storing large volume multimedia data.

A streaming server 30 transmits the multimedia stream, which is encoded by the encoding server 20, to clients 50 through the Internet 40. Then, the clients 50 decode the transmitted multimedia stream. The clients 50 should have a player with a codec to output the multimedia data.

In the meantime, some problems may occur when the stereoscopic video data are transmitted using conventional encoding methods and current Internet broadcasting system. Since left-eye images and right-eye images should be encoded separately to transmit stereoscopic video data to the clients through the Internet, the amount of data is increased more than twice and the probability of transmission error becomes higher due to the load of transmission traffic. Moreover, there is a problem that the clients should discriminate between the left-eye images and the right-eye images in order to decode them and output them synchronized with each other temporally. If the left-eye images and the right-eye images are not outputted alternately, a three-dimensional effect cannot be obtained, only to cause eye-fatigue of viewers.

Therefore, a new encoding method, other than conventional encoding methods, is required to broadcast stereoscopic video data on the Internet as well as an Internet broadcasting system and method coinciding with the encoding method.

DISCLOSURE OF INVENTION

Technical Solution

It is, therefore, an object of the present invention to provide a system and method for broadcasting stereoscopic video data on the Internet by encoding and multiplexing multimedia data based on a structure of Moving Picture Experts Group-4 (MPEG-4) temporal scalability (TS).

It is another object of the present invention to provide an Internet broadcasting system and method that can broadcast conventional two-dimensional video data on the Internet.

In accordance with one aspect of this invention, there is provided a system for broadcasting stereoscopic video data to a client on the Internet, including: an encoding server for encoding stereoscopic video data, audio data, and Object Descriptor/Binary Format for Scene (OD/BIFS), which is information for controlling a content, and encoding the data into elementary stream (ES) having an MPEG-4 structure; a web server for receiving from the client any one among two-dimensional video display mode, field-shuttering video display mode and frame-shuttering video display mode; and a streaming server for generating a real-time transport protocol (RTP) packet for real-time data transmission on the Internet by multiplexing the ES based on the display node inputted into the web server, and transmitting the RTP packet to the client.

In accordance with one aspect of the present invention, there is provided a method for broadcasting stereoscopic video data to a client on the Internet based on MPEG-4, including the steps of: a) receiving stereoscopic video data, audio data, and OD/BIFS data, which is information for controlling a content, and encoding the data into ES having an MPEG-4 structure; b) receiving any one among two-dimensional video display node, field-shuttering video display mode and frame-shuttering video display mode from the client; and c) generating an RTP packet for real-time transmission on the Internet by multiplexing the ES based on the inputted display mode, and transmitting the RTP packet to the client.

DESCRIPTION OF DRAWINGS

The above and other objects and features of the present invention will become apparent from the following description of the preferred embodiments given in conjunction with the accompanying drawings, in which.

MODE FOR INVENTION

Other objects and aspects of the invention will become apparent from the following description of the embodiments with reference to the accompanying drawings, which is set forth hereinafter. The terms and words used in the present specification and claims should not be construed as conventional or dictionary meaning, but they should be construed as concepts and meanings fit in with the technological concept of the present invention based on a principle that inventors could define the concept of terms properly to describe the invention most appropriately. Accordingly, the embodiment and drawings of the present specification are no more than one of the preferred embodiments and do not represent all the technological concept of the present invention. In the respect, there may be various equivalents and modifications that can replace the elements illustrated in the specification as of the filing of the present patent application.

Figure 2:
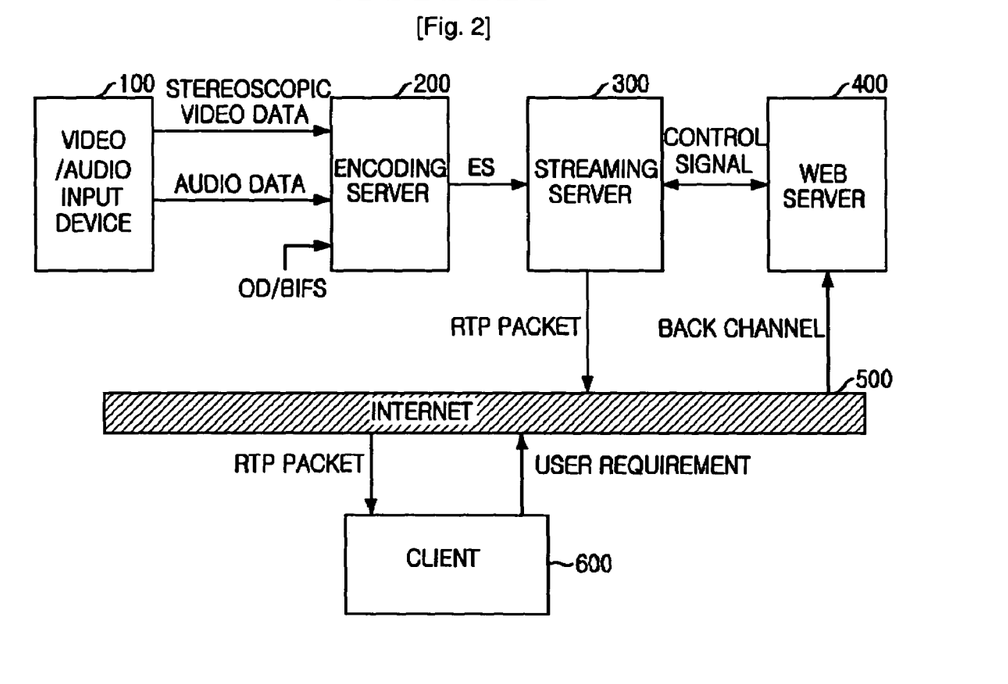
FIG. 2 is a block diagram depicting an Internet broadcasting system in accordance with a preferred embodiment of the present invention.

FIG. 2 is a block diagram depicting an Internet broadcasting system in accordance with a preferred embodiment of the present invention. As shown, multimedia data (i.e., stereoscopic video data or audio data) or content-controlling Object Descriptor/Binary Format for Scenes (OD/BIFS) data obtained from a stereoscopic video camera or a video/audio input device 100, such as video tape recorder (VTR), are inputted into an encoding server 200. Then, the encoding server 200 encodes the inputted signals based on Moving Picture Experts Group-4 (MPEG-4). An elementary stream (ES) obtained by encoding the signals in the encoding server 200 is transmitted to a streaming server 300.

To encode the stereoscopic video, the present invention uses an MPEG-4 temporal scalability (TS). MPEG-4 TS is a structure where inputted left-eye images are allocated to a base layer and right-eye images are allocated to the enhancement layer. The left-eye images allocated to the base layer are encoded based on the conventional two-dimensional video encoding. The right-eye images allocated to the enhancement layer are encoded with reference to the image of the base layer, which is overlapped with that of the environment layer.

Meanwhile, a web server 400 receives information on contents and a display mode requested by a client 600 through a back channel and transmits them to the streaming server 300. The streaming server 300 multiplexes the ES of the content in the display mode requested by the client 400 to generate multimedia data, e.g., a real-time transport protocol (RTP) packet, and transmits the multimedia data to the client 600 through the Internet. The client 600 decodes and displays the data in the transmitted order. To output multimedia data, the client 600 should have a player with a codec necessarily.

Figure 3:
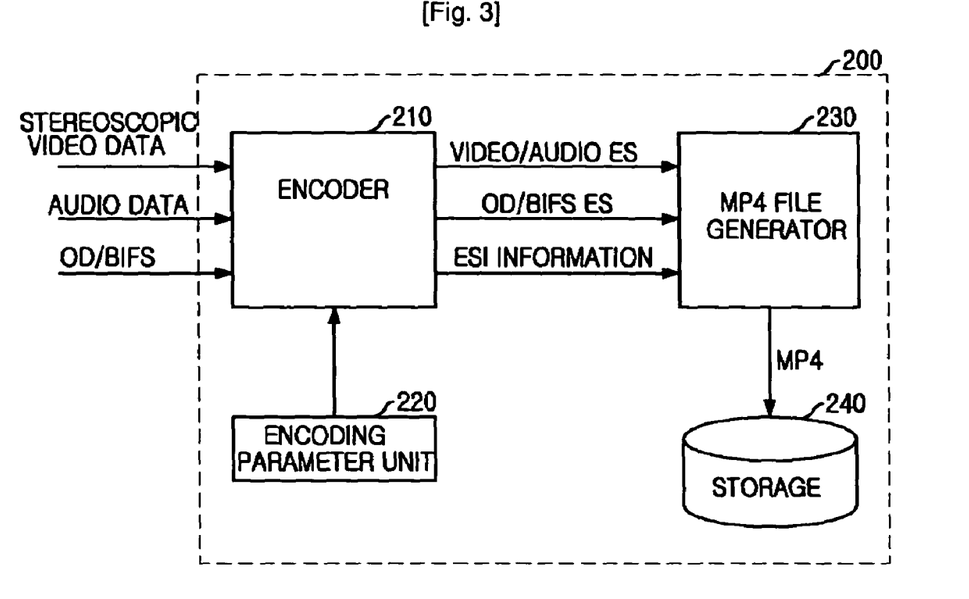
FIG. 3 is a block diagram showing an encoding server of FIG. 2 in detail.

FIG. 3 is a block diagram showing an encoding server of FIG. 2. As shown, the encoding server 200 includes an encoder 210, an encoding parameter unit 220, an a MPEG layer 4 (MP4) file generator 230 for generating an MP4 file by using encoded ES, and a storage 240 for storing the MP4 file.

The encoding parameter unit 220 provides information for encoding the inputted stereoscopic video. It sets up parameters for encoding, such as a size of an image, the number of frames to be encoded, a frame rate, a size of motion search, a transmission bit rate, and an initial quantization coefficient, and inputs them to the encoder 210.

The encoder 210 encodes the inputted stereoscopic video data and audio data based on the MPEG-4 TS and audio codec. Internal modules of the encoder 210 are illustrated in FIG. 4.

Figure 4:
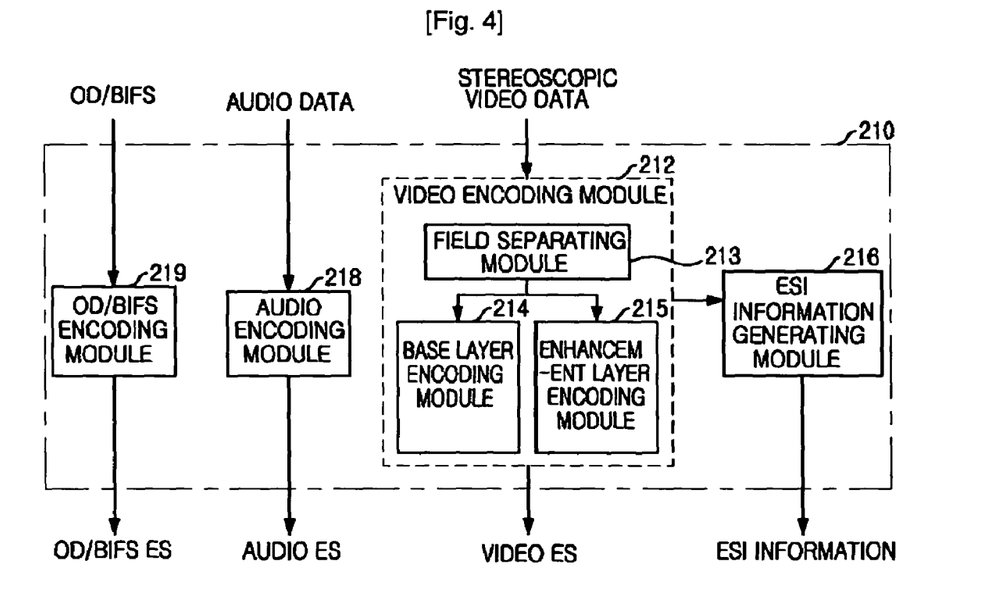
FIG. 4 is a block diagram showing an encoder of FIG. 3 in detail.

Referring to FIG. 4, the encoder 210 includes a video encoding module 212 for encoding stereoscopic video data, an Elementary Stream Interface (ESI) information generating module 216, an audio encoding module 218 for encoding audio data, and an OD/BIFS encoding module 219 for encoding OD/BIFS data.

The OD/BIFS encoding module 219 encodes binary format for scene (BIFS) for describing audio and scenes and object descriptor (OD) for defining the relationship between media streams.

The ESI information generating module 216 generates additional information needed for the transmission and decoding of ES, such as a data length of ES, an idle flag, and a length of access unit (AU), which are included in a header information of a synchronization layer (SL). The header information of SL will be described later.

The video encoding module 212 further includes a field separating module 213, a base layer encoding module 214, and an enhancement layer encoding module 215. The field separating module 213 separates a stereoscopic three-dimensional video data into a left-eye odd field, a left-eye even field, a right-eye odd field, and a right-eye even field. The base layer encoding module 214 encodes the left-eye odd field, and the enhancement layer encoding module 215 encodes the left-eye even field, right-eye odd field and right-eye even field.

Figure 5:
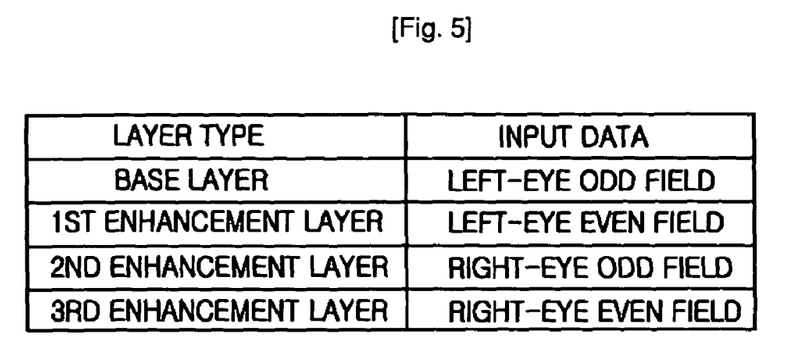
FIG. 5 is a diagram showing a video data inputted into each layer of a Moving Picture Experts Group-4 (MPEG-4) structure in accordance with the preferred embodiment of the present invention.

FIG. 5 is a diagram showing fields separated by the field separating nodule being inputted into each layer of an MPEG-4 structure in accordance with the preferred embodiment of the present invention. As shown, the left-eye odd field is inputted into the base layer; the left-eye even field into a first enhancement layer; the right-eye odd field into a second enhancement layer; and the right-eye even field into a third enhancement layer.

Figure 6:
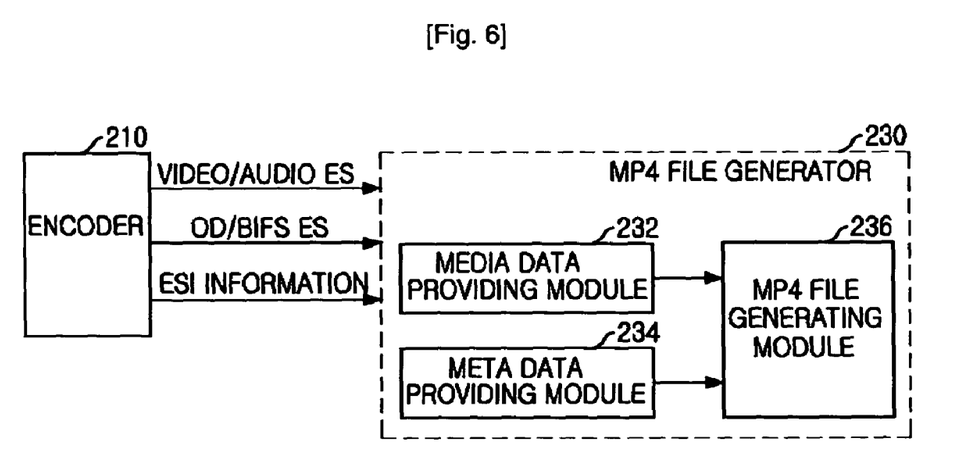
FIG. 6 is a block diagram illustrating an MPEG 4 (MP4) file generator of FIG. 3 in detail.

FIG. 6 is a block diagram illustrating an MP4 file generator of FIG. 3. As shown, the MP4 file generator 230 which receives video/audio ES, OD/BIFS ES and ESI information from the encoder 210 includes a media data providing module 232, a metadata providing module 234 and an MP4 file generating module 236.

The media data providing module 232 is a buffer for receiving video ES, audio ES and OD/BIFS ES, which are encoded on a field-by-field basis. It transmits the ES as to the MP4 file generating module 236.

The metadata providing module 234 is a buffer for receiving ESI information transmitted from the encoder 210, and transmitting the ESI information as a metadata to the MP4 file generating module 236.

The MP4 file generating module 236 converts the inputted ES and the metadata into an MP4 file format. This is to generate and store a file of a format suitably for transmission by receiving ES outputted from the encoder and additional information for the ES, extracting ES in coincidence with the display mode requested by a user.

An MP4 file has two zones: One is a metadata zone for storing file information, and the other is an mdata Atom zone for storing ES. The ES stored in the mdata Atom zone is given a proper ED identification ES_ID to discriminate encoded ES.

Figure 7:
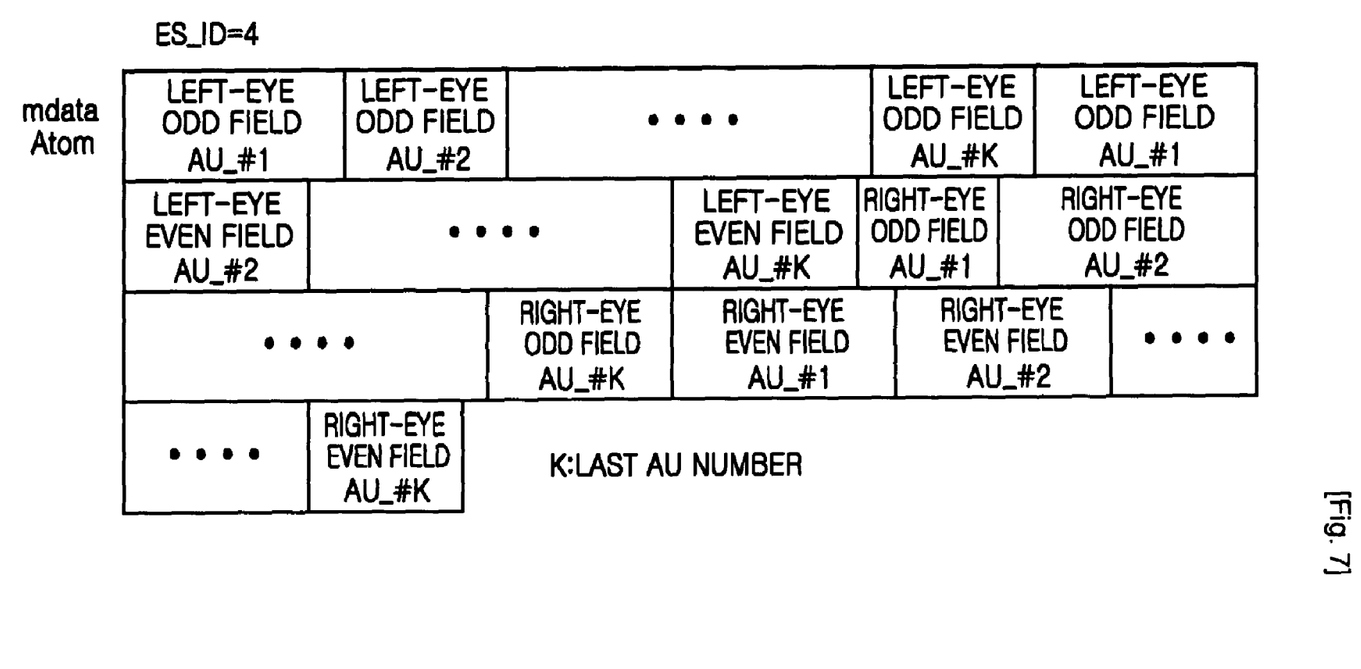
FIGS. 7 and 8 are diagrams describing arrangements of elementary stream (ES) of an MP4 file.
Figure 8:
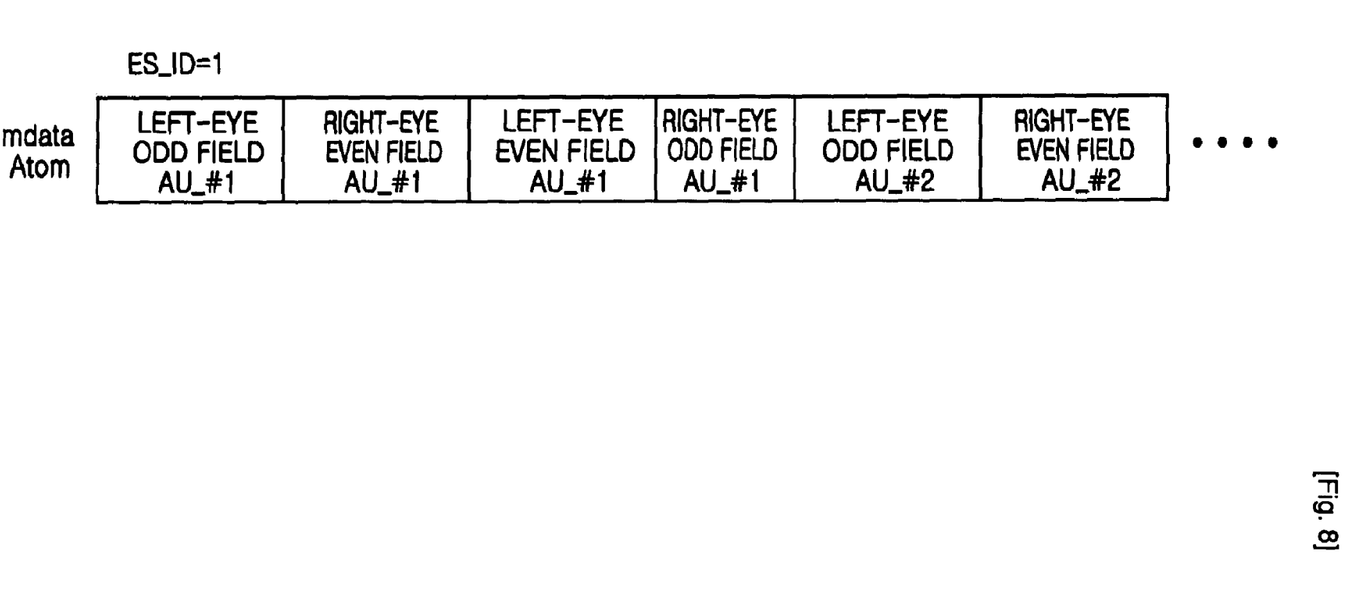

FIG. 7 is an exemplary diagram illustrating an arrangement of ES in the mdata Atom for storing the media data, the ES being given four ES_ID based on the right and left odd and even fields. FIG. 8 is an exemplary diagram illustrating an arrangement of ES for stereoscopic video data in the mdata Atom by multiplexing four fields of the ES. The ES is inputted on a four-field basis, i.e., a left-eye odd field, a right-eye even field, a left-eye even field and a right-eye odd field. One ES_ID is allocated to four fields having the same time information.

The MP4 file generated through the above processes is stored in a storage 240 and extracted by the streaming server 300.

Figure 9:
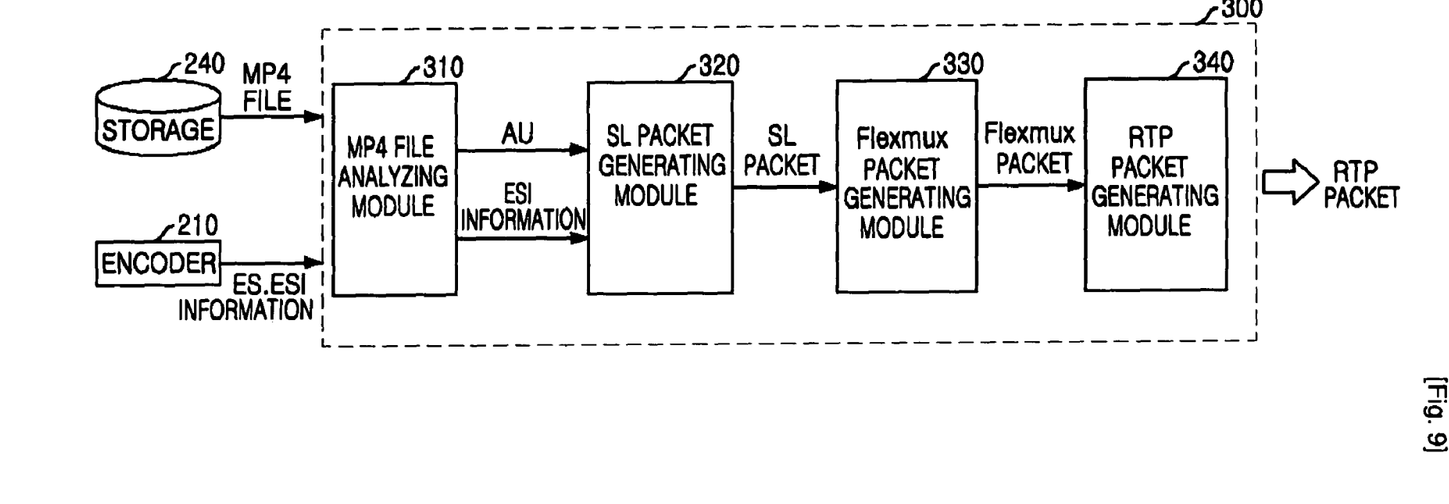
FIG. 9 is a block diagram illustrating a streaming server of FIG. 2 in detail.

FIG. 9 is a block diagram illustrating a streaming server of FIG. 2. As shown, the streaming server 300 extracts MP4 files stored in the storage 240, or receives encoded ES and ESI information encoded by the encoder 210, generates a real-time transport protocol (RTP) packet that coincides with a user's request, and transmits it to a client 600.

In order to generate the RTP packet that coincides with the user's request, a display mode requested by the user should be inputted into the streaming server 300. Accordingly, the display mode requested by the user should be inputted from the client 600 and a web server 400 and then transmitted to a streaming server 300.

In the Internet broadcasting system of the present invention, a video data is encoded after divided into a left-eye odd field, a left-eye even field, a right-eye odd field and a right-eye even field. Therefore, conventional two-dimensional video data, field-shuttering three-dimensional video data or frame-shuttering three-dimensional video data can be all processed in this system.

For example, if a user wants the conventional two-dimensional video display, the streaming server 300 transmits a stream of the left-eye odd field and the left-eye even field. If the user wants field-shuttering three-dimensional video display, it extracts and transmits a stream of the left-eye odd field and the right-eye even field. Likewise, if the user wants frame-shuttering three-dimensional display, it transmits a stream of all of the four fields.

If the user's request on the display mode is inputted into a MP4 file analyzing module 310 through the web server 400, the MP4 file analyzing module 310 extracts a needed AU stream and ESI information from the MP4 files stored in the storage 240. Here, the MP4 file analyzing nodule 310 can receive the AU stream and the ESI information from the encoder 210 in real-time.

When the MP4 file analyzing module 310 extracts the AU stream and the ESI information based on the request of the user, a SL packet generating module 320 generates an SL packet having a header and a payload for the extracted AU stream. The header of the SL packet is synchronization information for each packet and it is used to check continuity when data loss occurs. The header includes information for controlling time synchronization, such as time stamp. The payload of the SL packet is valid information that comes after the header. The payload includes the AU stream extracted by the MP4 file analyzing module 310.

The generated SL packet is inputted into a FlexMux packet generating module 330 FlexMux, and the FlexMux packet generating module 330 generates a FlexMux packet by adding a header that defines a packet type to the SL packet. The packet type means information for distinguishing video data from audio data.

The generated FlexMux packet is inputted into an RTP packet generating module 340. Then, the RTP packet generating module 340 generates an RTP packet that could be transmitted through the Internet in real-time.

The RTP packet is a protocol packet of a transport layer that makes it possible to transmit data on the Internet in real-time. The RTP packet can be generated by adding a header including information for real-time data transmission to a FlexMux packet.

Figure 10:
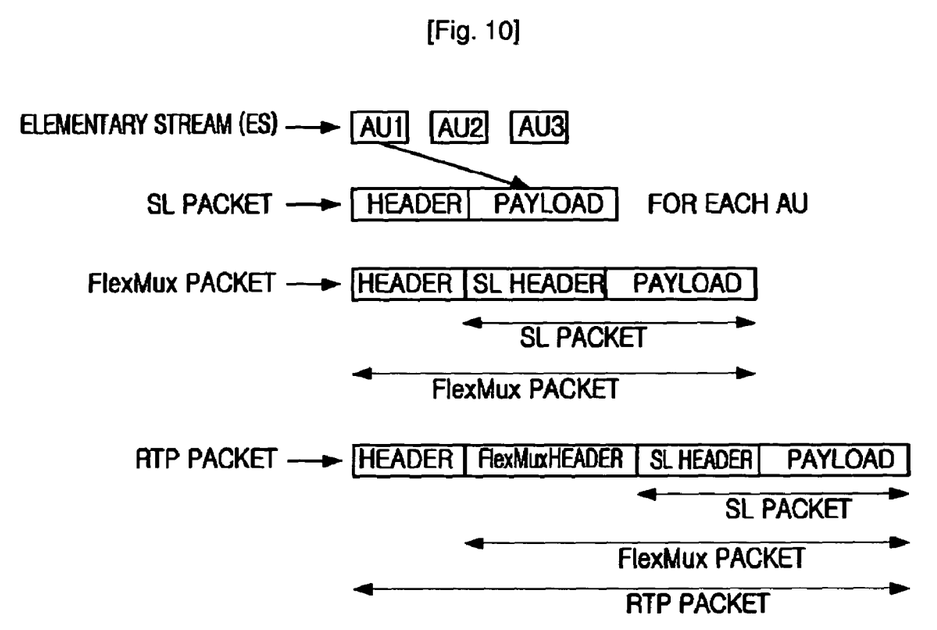
FIG. 10 is a diagram depicting a packing transformation process in the streaming server.

FIG. 10 is a diagram depicting a packing transformation process in the streaming server. The RTP packet generated in the above is transmitted to a client 600 through the Internet in real-time, and a player mounted on the client 600 decodes the RTP packet and displays it.

If the packet is a field-shuttering three-dimensional video RTP packet, the player can produce three-dimensional distance effect by outputting a stream of left-eye odd field and a stream of right-eye even field in the transmitted order, instead of discriminating between left-eye odd field stream and right-eye even field stream and synchronizing their time with each other and output them. In short, since the RTP packet multiplexed by the streaming server 300 is packetized in the order of necessary field streams based on the display mode requested by the user, the client 600 can output stereoscopic video data without an additional data processing.

The Internet broadcasting system and method of the present invention can reduce the amount of data considerably by encoding a stereoscopic video data effectively, thus reducing the probability of transmission error occurrence. Therefore, it is possible to broadcast stereoscopic videos on the Internet in real-time.

In addition, the Internet broadcasting system of the present invention can restore not only stereoscopic videos but also conventional two-dimensional videos based on the display mode requested by the user.

While the present invention has been described with respect to certain preferred embodiments, it will be apparent to those skilled in the art that various changes and modifications may be made without departing from the scope of the invention as defined in the following claims.

The invention claimed is:

1. A system for broadcasting MPEG-4-based stereoscopic video data on the Internet, comprising:
    an encoding server for encoding stereoscopic video data, audio data, and Object Descriptor/Binary Format for Scene (OD/BIFS) which is information for controlling a content, into elementary stream (ES) having a Moving Picture Experts Group (MPEG)-4 structure;
    a Web server for receiving from the client any one among two-dimensional video display mode, field-shuttering video display node and frame-shuttering video display mode; and
    a streaming server for generating a real-time transport protocol (RTP) packet for real-time data transmission on the Internet by multiplexing the ES based on the display mode inputted into the web server, and transmitting the RTP packet to the client.

2. The system as recited in claim 1, wherein the encoding server includes:
    an encoding unit for encoding the stereoscopic video data, the audio data and the OD/BIFS into ES having a structure of MPEG-4 temporal scalability (TS);
    an encoding parameter unit for providing encoding information having a size of an image and the number of frames to be encoded, to the encoding unit;
    an MPEG 4 (MP4) file generating unit for generating an MP4 file by adding metadata to the ES; and a storage for storing the MP4 file.

3. The system as recited in claim 2, wherein the encoding unit includes:
   an OD/BIFS encoding module for encoding the OD/BIFS data;
   an audio encoding module for encoding the audio data;
   a video encoding module for encoding the stereoscopic video data; and
   an Elementary Stream Interface (ESI) information generating module for generating additional information needed for the transmission and decoding of the ES.

4. The system as recited in claim 3, wherein the video encoding module includes:
   a field separating nodule for separating the stereoscopic video data into a left-eye odd field, a left-eye even field, a right-eye odd field and a right-eye even field;
   a base layer encoding module for encoding the left-eye odd field; and
   an enhancement encoding module for encoding the left-eye even field, the right-eye odd field and the right-eye even field.

5. The system as recited in claim 4, wherein the enhancement encoding module allocates the left-eye even field to a first enhancement layer; the right-eye odd field to a second enhancement layer; and the right-eye even field to a third enhancement layer, and encodes the left-eye even field, the right-eye odd field and the right-eye even field based on the MPEG-4 TS structure.

6. The system as recited in claim 4, wherein the MP4 file generating unit generates an MP4 file by giving one ES identification (ES_ID) to a set of a left-eye odd field, a left-eye even field, a right-eye odd field and a right-eye even field in the ES.

7. The system as recited in claim 4, wherein if a display node inputted from the web server is a two-dimensional video display mode, the streaming server transmits an ES of a left-eye odd field and a left-eye even field to the client;
   if the display mode inputted from the web server is a field-shuttering display node, the streaming server multiplexes an ES of the left-eye odd field and the right-eye even field sequentially and transmits the ES to the client; and
   if the display node inputted from the web server is a frame-shuttering display mode, the streaming server multiplexes an ES having the left-eye odd field, left-eye even field, right-eye odd field and the right-eye even field fields sequentially and transmits the ES to the client.

8. A method for broadcasting stereoscopic video data to a client on the Internet based on MPEG-4, comprising the steps of:
   a) encoding stereoscopic video data, audio data, and Object Descriptor/Binary Format for Scene (OD/BIFS) which is information for controlling a content into ES having an MPEG-4 structure;
   b) receiving any one among two-dimensional video display mode, field-shuttering video display node and frame-shuttering video display node from the client; and
   c) generating an RTP packet for real-time transmission on the Internet by multiplexing the ES based on the inputted display mode, and transmitting the RTP packet to the client.

9. The method as recited in claim 8, wherein the step a) includes the steps of:
   a1) encoding the stereoscopic video data into ES having a structure of MPEG-4 TS;
   a2) generating an MP4 file by adding metadata to the ES; and
   a3) storing the MP4 file in a storage.

10. The method as recited in claim 9, wherein the step a1) includes the steps of:
   a1-1) encoding the OD/BIFS data;
   a1-2) encoding the audio data;
   a1-3) encoding the stereoscopic video data; and
   a1-4) generating additional information needed for the transmission and decoding of the ESs.

11. The method as recited in claim 10, wherein the step a1-3) includes the steps of:
   a1-3a) separating the stereoscopic video data into a left-eye odd field, a left-eye even field, a right-eye odd field and a right-eye even field;
   a1-3b) encoding the left-eye odd field; and
   a1-3c) encoding the left-eye even field, the right-eye odd field and the right-eye even field.

12. The method as recited in claim 11, wherein, at the step a1-3c), the left-eye even field is allocated to a first enhancement layer; the right-eye odd field is allocated to a second enhancement layer; and the right-eye even field is allocated to a third enhancement layer; and the left-eye even field, the right-eye odd field and the right-eye even field are encoded based on the MPEG-4 TS structure.

13. The method as recited in claim 11, wherein, at the step a1-3c), an MP4 file is generated by giving one ES_ID to a set of a left-eye odd field, a left-eye even field, a right-eye odd field and a right-eye even field in the ES.

14. The method as recited in claim 11, wherein, at the step c), if a display mode inputted from the web server is a two-dimensional video display mode, an ES having a left-eye odd field and a left-eye even field is transmitted to the client;
   if the display mode inputted from the web server is a field-shuttering display mode, an ES having the left-eye odd field and the right-eye even field is multiplexed sequentially and transmitted to the client; and
   if the display mode inputted from the web server is a frame-shuttering display node, an ES having the left-eye odd field, left-eye even field, right-eye odd field and the right-eye even field is multiplexed sequentially and transmitted to the client.

* * * * *